Sept. 5, 1950     M. L. FREDERICK     2,521,356

TRAILER HITCH AND BUMPER COMBINED

Filed Sept. 30, 1948

Inventor

Martin L. Frederick

By Clarence A. O'Brien
and Harvey B. Jacobson
Attorneys

Patented Sept. 5, 1950

2,521,356

UNITED STATES PATENT OFFICE 2,521,356

TRAILER HITCH AND BUMPER COMBINED

Martin L. Frederick, St. Louis Park, Minn.

Application September 30, 1948, Serial No. 52,015

4 Claims. (Cl. 280—33.44)

The present invention relates to a novel vehicle bumper and an accompanying trailer hitch wherein the two utilities are combined into a solid entity, thus providing a unique bumper and hitch combined.

The principal object of the invention is to rigidly mount a ball-type trailer hitch on the central portion of a rear bumper where said hitch is readily available for reliable and satisfactory use.

More specifically, novelty is predicated upon a combination bumper and hitch of the stated type wherein the bumper is provided with a notch, said hitch being lined up with the notch and said notch being concealed, when not in use, by a hingedly mounted cover plate or shield.

In carrying out the preferred embodiment of the invention, the bumper is provided with a longitudinal reinforcing bar provided with an integral shelf-like extension or lug, the latter carrying the ball-type hitch, that portion of the bumper in front of the hitch being notched and said notch being constructed with detents to accommodate coacting detents on the cover so as to securely hold the cover in closed position, to cover the notch, when the hitch is not in use, thereby giving the bumper a conventional overall appearance.

Other objects and advantages will become more readily apparent from the following description and the accompanying illustrative drawings.

Figure 4:
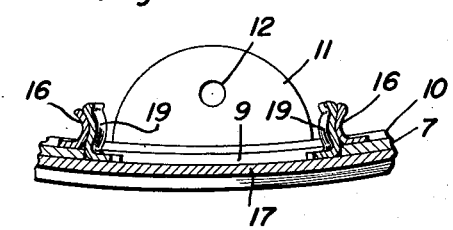
Figure 4 is a horizontal fragmentary sectional and elevational view taken on the plane of the line 4—4 of Figure 1, looking in the direction of the arrows.

Referring now to the drawings, the numeral 7 designates a suitably constructed and ornamented rear automobile or equivalent bumper and having bumper guards 8. In accordance with the present invention, the upper central edge portion of the bumper is cut-out to provide a clearance and hitch access notch 9. Welded or otherwise secured to the bumper and running the full length of same is a reinforcing rod or bar 10 which serves as a stabilizer and also as a foundation member. It is to the bar 10 that the lug, substantially semi-circular in shape, is attached, said lug denoted by the numeral 11. The lug has a hole 12 as shown in Figure 4 to accommodate the screw threaded stud 13 on the shank portion 14 of the ball-type trailer hitch 15. The numeral 16 designates an assembling and retaining nut carried by the stud. It will be noted that the ball joint or hitch 15 is lined up with the clearance notch 9. At opposite ends of the notch I provide suitable spring clips 16 which serve as detents.

Figure 1:
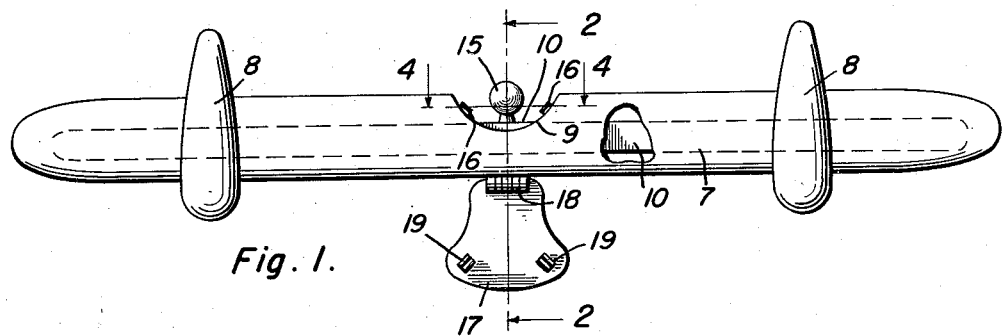
Figure 1 is a rear elevational view, with a portion broken away, showing a bumper and hitch as constructed in accordance with my invention and showing the shield or cover swung down to open position.
Figure 2:
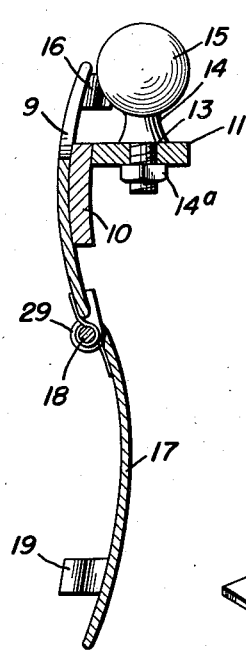
Figure 2 is an enlarged cross section taken on the vertical line 2—2 of Figure 1, looking in the direction of the arrows.
Figure 3:
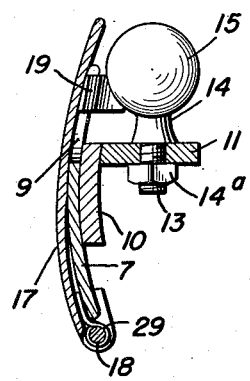
Figure 3 is a view based on Figure 2 showing the shield or cover closed.

The aforementioned shield or cover, which is suitably ornamental and designed to overlap the central area of the bumper, is denoted by the numeral 17. It is so made as to close, when in closed position as shown in Figure 3, the stated notch 9. It is hingedly mounted on the lower edge portion of the bumper as at 18 and provided with additional spring clips which constitute keepers or detents 19 and these are releasably engageable with the fixed detents 16 as shown in Figure 4. Thus, the coaction of the respective sets of detents serves to keep the shield in closed position. When the hitch is in use, the cover is swung down as denoted in Figure 1 and also on a larger scale in Figure 2. When closed, it takes the position shown in Figures 3 and 4.

Figure 5:
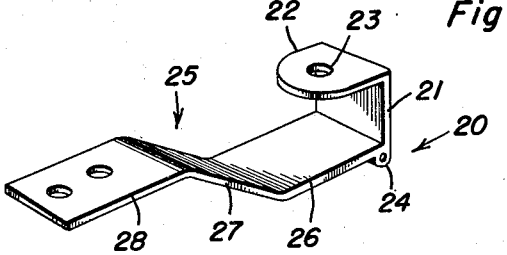
Figure 5 is a perspective view showing a modified aspect of the invention.

The numeral 20 in Figure 5 denotes a modified fixture which comprises means to support the ball-type hitch and embodies a vertical portion 21 which is adapted to be welded or otherwise secured to the bumper, the same having an integral lateral extension 22 with a bolt hole 23 thus providing an apertured lug for said hitch. The numeral 24 designates a knuckle which may be used to hingely support the cover and the numeral 25 designates a brace including portions 26, 27 and 28 properly shaped and related for secure anchorage on the frame (not shown) of an automobile. This modified fixture may be used instead of the brace and lug arrangement shown in Figures 1 to 4 inclusive. As a matter of fact, there will have to be variations in shape and sizes to adapt the invention to fit on different makes of automobiles and equivalent vehicles. It may be desirable also under certain conditions to incorporate a spring 29 (see Figures 2 and 3) in the hinge to normally urge the cover to a downward retained position and to keep same from swinging and rattling when the cover is open.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

1. A combined hitch and bumper assembly comprising an automobile bumper, said bumper being provided in its upper edge and intermediate opposite transverse ends with a clearance notch, a reinforcing member horizontally welded to one side of said bumper, a ball-type trailer hitch removably mounted on said member, said hitch being in alignment with said notch.

2. A combined hitch and bumper assembly comprising an automobile bumper, said bumper being provided in its upper edge and intermediate opposite transverse ends with a clearance notch, a reinforcing member horizontally welded to one side of said bumper, a ball-type trailer hitch removably mounted on said member, said hitch being in alignment with said notch, detent clips carried by said one side of the bumper and located on diametrically opposite sides of the notch, and a hingedly mounted cover plate for said notch, said cover plate being provided with detent clips releasably engageable with the first named clips.

3. In a structure of the class shown and described, an automobile bumper provided intermediate its ends and in its upper edge portion with a clearance notch, a ball-type trailer hitch rigidly mounted on the forward side of said bumper and in alignment with said notch, and a hingedly mounted cover plate carried by said bumper and swingable to a position to cover said notch and conceal said hitch.

4. In a structure of the class shown and described, an automobile bumper provided intermediate its ends and in its upper edge portion with a clearance notch, a ball-type trailer hitch rigidly mounted on the forward side of said bumper and in alignment with said notch, a hingedly mounted cover plate carried by said bumper and swingable to a position to cover said notch and conceal said hitch, detent clips carried by said bumper and located on opposite sides of the notch, and coacting detent clips carried by said cover plate and releasably engageable with said first named clips.

MARTIN L. FREDERICK.

REFERENCES CITED

The following references are of record in the file of this patent:

UNITED STATES PATENTS

| Number | Name | Date |
| --- | --- | --- |
| 2,151,920 | Jandus et al. | Mar. 28, 1939 |
| 2,342,907 | Stall | Feb. 29, 1944 |
| 2,446,347 | Walkewiak | Aug. 3, 1948 |